US010922873B2

(12) United States Patent
Dwyer

(10) Patent No.: US 10,922,873 B2
(45) Date of Patent: Feb. 16, 2021

(54) RENDERING A 3-D SCENE USING SECONDARY RAY TRACING

(71) Applicant: Imagination Technologies Limited, Kings Langley (GB)

(72) Inventor: Aaron Dwyer, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/573,248

(22) Filed: Sep. 17, 2019

(65) Prior Publication Data

US 2020/0013213 A1    Jan. 9, 2020

Related U.S. Application Data

(63) Continuation of application No. 16/165,584, filed on Oct. 19, 2018, now Pat. No. 10,460,507, which is a continuation of application No. 13/962,079, filed on Aug. 8, 2013, now Pat. No. 10,140,751.

(51) Int. Cl.
  *G06T 15/06* (2011.01)
  *G06T 15/50* (2011.01)

(52) U.S. Cl.
  CPC .............. *G06T 15/06* (2013.01); *G06T 15/50* (2013.01)

(58) Field of Classification Search
  None
  See application file for complete search history.

(56) References Cited

U.S. PATENT DOCUMENTS

| 4,901,064 | A | 2/1990 | Deering |
| 5,808,619 | A | 9/1998 | Choi et al. |
| 2003/0227457 | A1 | 12/2003 | Pharr et al. |
| 2006/0158450 | A1 | 7/2006 | Ferguson et al. |
| 2007/0195083 | A1* | 8/2007 | Yoo .......................... G06T 15/04 345/420 |
| 2013/0197868 | A1* | 8/2013 | Olsson ............... G06K 9/00214 703/1 |

(Continued)

OTHER PUBLICATIONS

Bloomenthal, Jules. "Polygonization of implicit surfaces." Computer Aided Geometric Design 5.4 (1988): 341-355.

(Continued)

*Primary Examiner* — Andrew G Yang
(74) *Attorney, Agent, or Firm* — Potomac Law Group, PLLC; Vincent M DeLuca

(57) ABSTRACT

During tracing of a primary ray in a 3-D space (e.g., a 3-D scene in graphics rendering), a ray is found to intersect a primitive (e.g., a triangle) located in the 3-D space. Secondary ray(s) may be generated for a variety of purposes. For example, occlusion rays may be generated to test occlusion of a point of intersection between the primary ray and primitive is illuminated by any of the light(s). An origin for each secondary ray can be modified from the intersection point based on characteristics of the primitive intersected. For example, an offset from the intersection point can be calculated using barycentric coordinates of the intersection point and interpolation of one or more parameters associated with vertices defining the primitive. These parameters may include a size of the primitive and differences between a geometric normal for the primitive and a respective additional vector supplied with each vertex.

19 Claims, 5 Drawing Sheets

(56) References Cited

U.S. PATENT DOCUMENTS

| | | | |
|---|---|---|---|
| 2013/0328873 A1 | 12/2013 | Harada et al. | |
| 2014/0022251 A1* | 1/2014 | Aila | G06T 15/506 345/426 |
| 2014/0063016 A1 | 3/2014 | Howson et al. | |

OTHER PUBLICATIONS

Heckbert, Paul S. "Survey of texture mapping." Computer Graphics and Applications, IEEE 6.11 (1986): 56-67.

Heckbert, Paul S., and Henry P. Moreton. "Interpolation for polygon texture mapping and shading." State of the art in Computer graphics: Visualization and Modeling (1991): 101-111.

Heidrich, Wolfgang, and Hans-Peter Seidel. "Realistic, hardware-accelerated shading and lighting." Proceedings of the 26th annual conference on Computer graphics and interactive techniques. ACM Press/Addison-Wesley Publishing Co. 1999.

Jin, Shuangshuang, Robert R. Lewis, and David West. "A comparison of algorithms for vertex normal computation." The Visual Computer 21.1-2 (2005): 71-82.

Peercy, Mark, John Airey, and Brian Cabral. "Efficient bump mapping hardware." Proceedings of the 24th annual conference on Computer graphics and interactive techniques. ACM Press/Addison-Wesley Publishing Co., 1997.

Schlick, Christophe. "A survey of shading and reflectance models." Computer Graphics Forum. vol. 13. No. 2. Blackwell Science Ltd, 1994.

Sherstyuk, Andrei. "Fast ray tracing of implicit surfaces." Computer Graphics Forum. vol. 18. No. 2. Blackwell Publishers Ltd, 1999.

Snyder, John M. and Alan H. Barr. Ray tracing complex models containing surface tessellations. vol. 21. No. 4. ACM, 1987.

Turk, Greg, and James F. O'brien. "Modelling with implicit surfaces that interpolate." ACM Transactions on Graphics (TOG) 21.4 (2002): 855-873.

Van Overveld, Cornelius WAM, and Brian Wyvill. "Phong normal interpolation revisited." ACM Transactions on Graphics (TOG) 16.4 (1997): 397-419.

\* cited by examiner

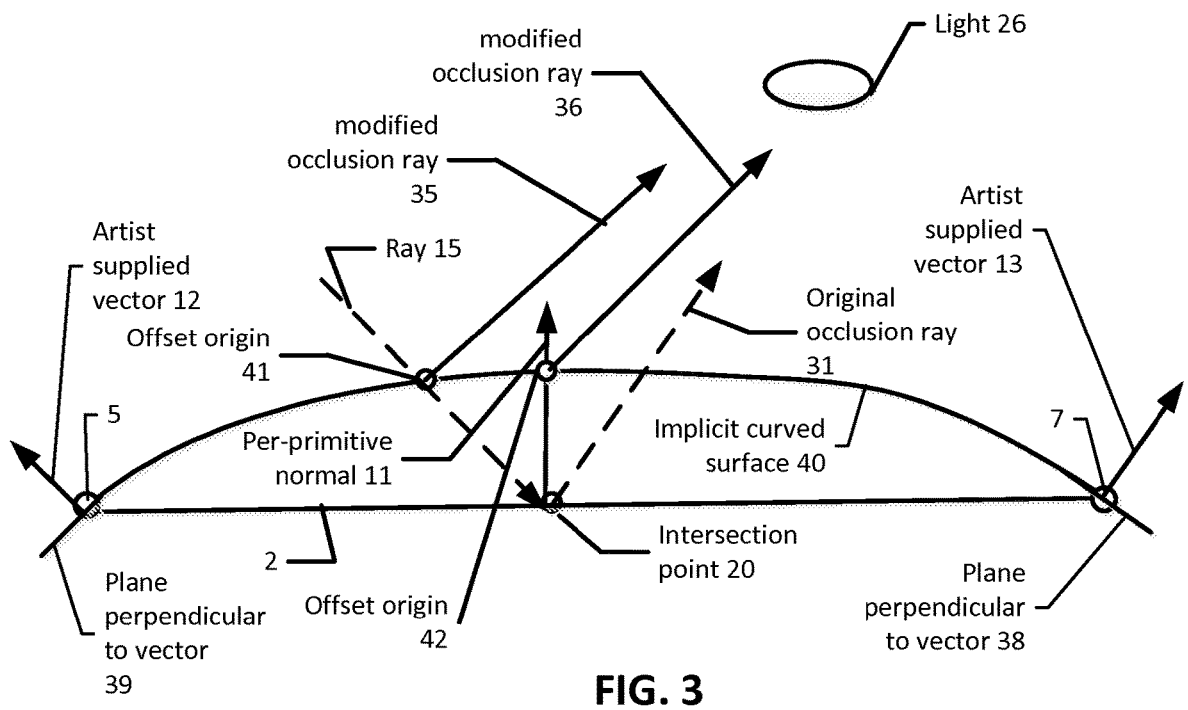
FIG. 3
FIG. 4
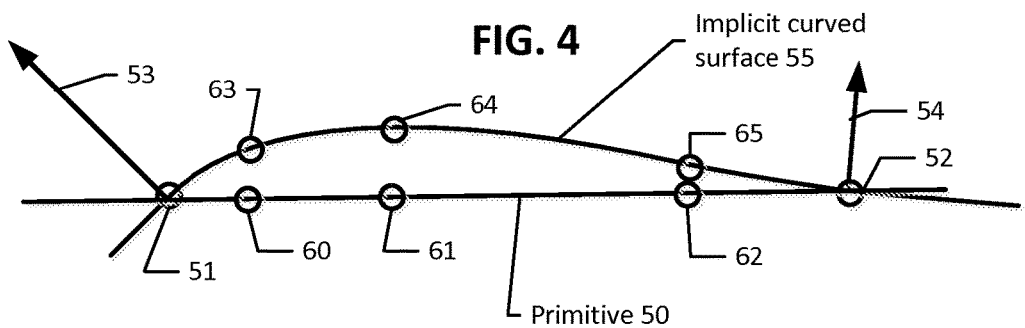
FIG. 5
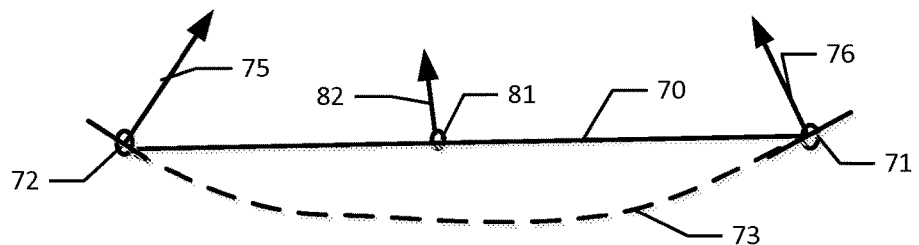

RENDERING A 3-D SCENE USING SECONDARY RAY TRACING

BACKGROUND

Field

The present invention generally relates to ray tracing based rendering two-dimension representations from three-dimensional scenes, and in one particular aspect, to tracing of secondary rays in ray tracing for rendering of images from 3-D scenes.

Description of Related Art

Rendering photo-realistic images with ray tracing is known to produce photo-realistic images, including realistic shadow and lighting effects, because ray tracing can model the physical behavior of light interacting with elements of a scene. Ray tracing usually involves obtaining a scene description composed of geometric primitives, such as triangles, that describe surfaces of structures in the scene, and modeling how light interacts with primitives in the scene by tracing light rays, starting from a virtual camera, through numerous potential interactions with scene objects, until terminating either at light sources, or exiting the scene without intersecting a light source. Additionally, when a surface is found to have been intersected by a ray, additional rays may be used to determine whether that intersected surface is in shadow from potential sources of light energy, and for other purposes, such as for characterizing reflections or refractions.

SUMMARY

Generating images using ray tracing can be computationally expensive, with computation required for two principal categories of activities: testing rays for intersection and shading identified ray intersections. Different surfaces require different intersection testing algorithms, and in some cases a variety of algorithms exist to test a particular kind of surface. In general, simpler surfaces can be tested for intersection using algorithms that require less computational cost. For example, testing a planar primitive, such as a triangle, is easier than testing a higher-order surface. However, a mesh of polygons (e.g., a triangle mesh) is only an approximation of an original surface, and where relatively-low polygon count models are used, there may be relatively significant deviation from the polygon mesh and the original model.

One area of ray tracing rendering affected thereby is the determination of the casting of secondary rays from an intersection identified for a primary ray. For example, when a primary ray is found to have intersected a surface, occlusion rays may be cast to determine shadowing at the point of intersection. For example, rays may be cast towards lights in the scene. Casting rays that originate from surfaces of planar polygon surfaces can result in hard and unrealistic shadowing effects. However, increasing polygon counts for scene objects is undesirable, in that more memory to store subject objects will be required. Implementing ray tracing rendering by testing higher order surfaces for intersection also poses challenges.

In one aspect, a method of tracing secondary rays, such as occlusion rays, from an intersection point is introduced. In such method, one or more secondary rays are defined to have respective origins that are offset from the surface. In one example, an offset is determined according to vectors associated with vertices defining the intersected surface. In one example, an implicit higher order surface can be modeled by varying an amount of offsets for rays found to intersect the surface at different points. A direction of offset can be along a normal direction of the surface, or along a direction of the ray that was found to intersect the surface, and resulting in such occlusion ray(s). For example, where a number of parent rays intersect the same primitive at different locations, and secondary ray(s) are to be traced for each ray, those secondary rays are defined to have an origin offset from the surface of the primitive in varying amounts. An amount of offset is variable among the secondary rays and dependent on an intersection location of a respective parent ray on the primitive.

In another aspect, an apparatus for ray tracing a 3-D scene comprises a ray intersector configured for identifying an intersection point between a primary ray and a primitive defining a surface located in the 3-D scene. The apparatus also comprises a specifier of a secondary ray configured for specifying a secondary ray to be emitted for tracing in the 3-D scene, the secondary ray having an origin and a direction. The specifier is configured to determine a position of the origin of the secondary ray by determining an offset amount from the intersection point. The offset amount is dependent on a relative position of the intersection point to vertices defining the surface located in the 3-D scene. The specifier is coupled to the ray intersector for providing the secondary ray to be tested for intersection by the ray intersector. The specifier can be coupled to the ray intersector through a call provided by an Application Programming Interface. The ray intersector can be implemented by instructions configuring a processor to execute an intersection testing algorithm. The ray intersector can be implemented with fixed function and/or limited programmability elements that can execute specific portions of an intersection testing algorithm (e.g., traversing a ray through an acceleration structure and testing a ray for intersection with a primitive). The specifier may comprise a portion of shader code configuring a processor, in response based on an intersection between the primary ray and the primitive.

Another aspect includes a non-transitory machine readable medium having stored thereon machine readable data and instructions. The data and instructions comprise instructions for reading data defining meshes of planar primitives located in the 3-D scene. Each primitive is defined by a set of vertexes located in respective positions in the 3-D scene, and having associated therewith respective vectors. The instructions also comprise instructions for generating a set of offset coefficients from the positions of the vertices in the 3-D scene and the vectors associated with the vertices and for tracing a primary ray in the 3-D scene to identify an intersection point between the primary ray and a primitive. The instructions also comprise instructions for determining a secondary ray in response to identifying the intersection point of the primary ray. The secondary ray has an origin offset from the intersection point of the primary ray by an amount determined based on the offset coefficients and a relative position of the intersection point on the primitive.

The functional aspects described can be implemented as modules, such as modules of computer executable code, configuring appropriate hardware resources operable to produce inputs and outputs as described.

BRIEF DESCRIPTION OF THE DRAWINGS

For a fuller understanding of aspects and examples disclosed herein, reference is made to the accompanying drawings in the following description.

FIG. 3 depicts a side-view of a primitive and an example approach to defining secondary rays with origin offsets according to the disclosure;

FIG. 4 depicts a side-view of a further example of secondary rays having origin offsets according to the disclosure;

FIG. 5 depicts an aspect of clamping a calculated origin offset under specified conditions;

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

As introduced in the background, a 3-D scene needs to be converted into a 2-D representation for display. Such conversion may include selecting a camera position, from which the scene is viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. A color vector for each pixel is determined through rendering. During ray tracing, rays can be initially cast from the camera position and intersect the plane of the 2-D representation at different points, and continue in(to) the 3-D scene.

For clarity in description, data for a certain type of object, e.g., a primitive (e.g., coordinates for three vertices of a triangle) often is described simply as the object itself, rather than referring to the data for the object. For example, if referring to "fetching a primitive", it is to be understood that data representative of that primitive is being fetched.

Representing realistic and finely detailed objects in the 3-D scene is usually done by providing a large number of planar geometric primitives that approximate a surface of the object (i.e., a wire frame model). As such, a more intricate object may need to be represented with more primitives and smaller primitives than a simpler object. Although providing a benefit of higher resolution, performing intersection tests between rays and larger numbers of primitives (as described above, and as will be described further below) is computationally intensive, especially since a complex scene may have many objects. Also, storage requirements increase as the number of primitives used to represent an object increases.

Figure 1:
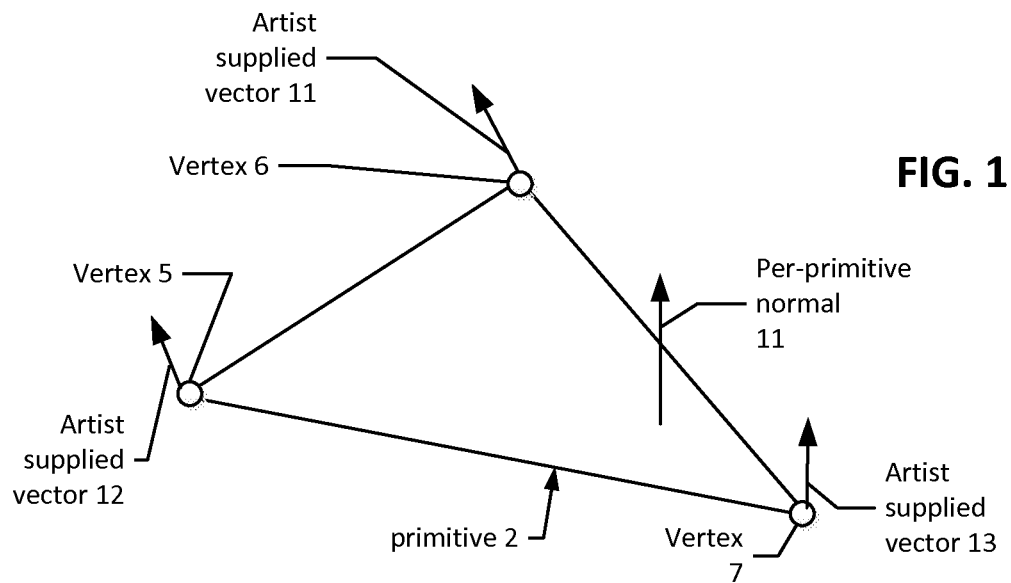
FIG. 1 depicts a planar primitive (e.g., a triangle) defined by vertices and associated with data used in an example implementation of the disclosure.

FIG. 1 depicts a planar primitive 2 being defined using three vertexes 5-7. In addition to position information for the vertexes, the primitive can be defined using a per-primitive normal 11 that defines an outer face of the primitive. FIG. 1 depicts a conceptual example of how a primitive may be defined by data stored on a non-transitory medium. In practice, primitive 2 can be defined within a mesh of primitives, where a set of vertices has connectivity information associated with it, for example. Thus, FIG. 1 does not explicitly or implicitly limit or require any particular approach to defining a planar primitive. Also, FIG. 1 depicts an example of a triangular planar primitive, but implementations of the disclosure can be used with other kinds of planar primitives. Still further implementations may be able to test non-planar primitives for intersection, and implement origin offsetting from intersection points according to the disclosure for such non-planar surface as well. However, a need for implementing such offsetting is generally expected to be less, in that a non-planar surface may be defined to more closely represent an idealized surface.

Figure 2:
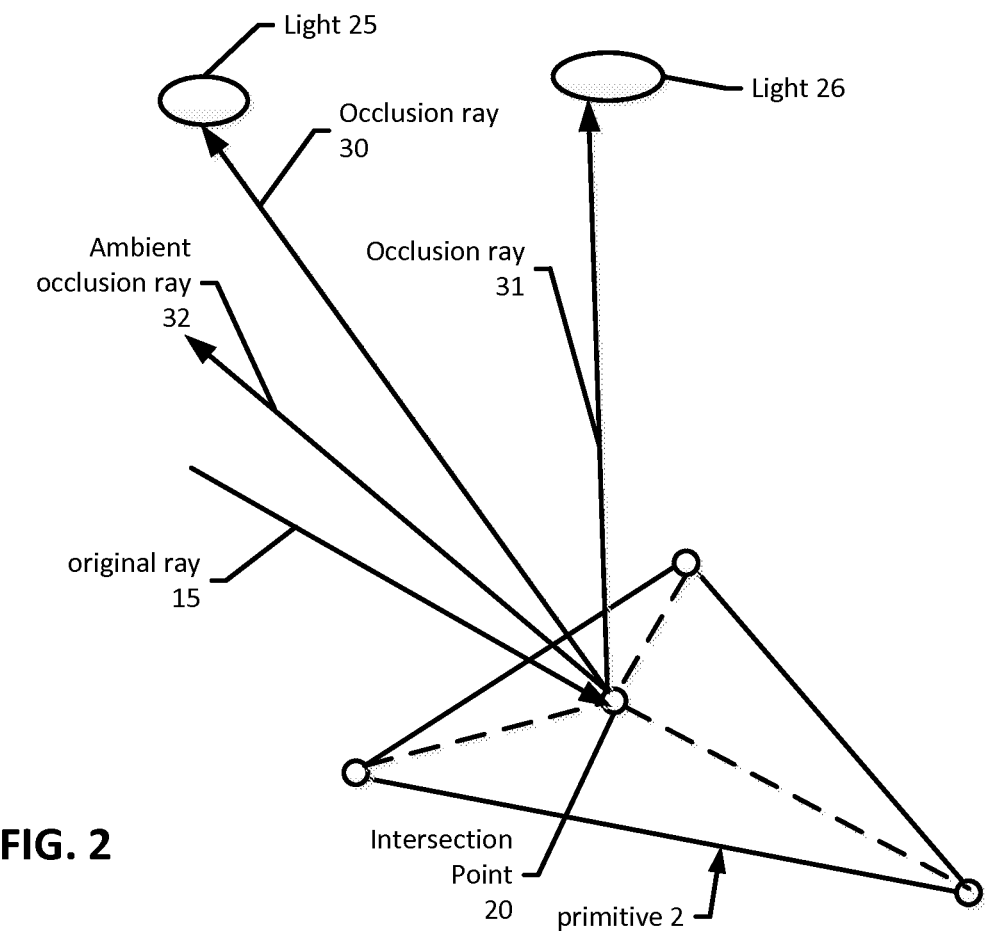
FIG. 2 depicts a situation where a primary ray is found to intersect a primitive, and secondary rays, such as occlusion rays are defined, to be traced in the 3-D scene.

FIG. 2 depicts a situation where a primary ray 15 is found to intersect primitive 2 at an intersection point 20. Finding an intersection between primary ray 15 and primitive 2 is performed using an intersection test algorithm that uses the planar primitive. Primary ray 15 can be any ray being traced in the system, and is "primary" relative to "secondary" rays that may be generated in response to finding an intersection for that ray. For example, a primary ray may itself be a secondary ray of another ray. A variety of algorithms to perform such intersection testing exist. In one implementation, a by-product of the intersection testing producing barycentric coordinates for intersection point 20. FIG. 2 also depicts that secondary rays are generated in response to finding intersection point 20 for primary ray 15. The example secondary rays of FIG. 2 include occlusion rays 31 and 32 respectively directed towards light sources 26 and 25. In one example, light sources 25 and 26 can be identified point or area sources of light energy entering the scene. For example, light sources 25 and 26 can be enumerated in position and have known characteristics. An ambient occlusion ray 32 also is shown being emitted from intersection point 20. Such ambient occlusion ray 32 may be part of a set of ambient occlusion rays that are stochastically generated. Examples of other kinds of secondary rays include reflection and refraction rays that would be emitted from the origin in a direction influenced by characteristics of a material of primitive 2. This disclosure concerning secondary rays is by way of example and not limitation as to the kinds of rays to which the origin offsetting can be applied. Rays also can be represented using a variety of formats, such as using an origin and direction, a line segment defined by two end points, a 5-D representation, and so on. As such, no limitation is explicit or implied as to how such rays may be represented.

FIG. 3 depicts a side view of primitive 2, showing a line defined by vertex 5 and vertex 7 (see FIG. 1), and depicts a variety of elements used to illustrate an example according to the disclosure. Artist vectors 12 and 13 are respectively associated with vertexes 5 and 7. A plane 39 perpendicular to artist vector 12, and a plane 38 perpendicular to artist vector 13 are shown in cross section. FIG. 3 depicts that an implicit curved surface 40 is defined to be tangent to plane 38 at vertex 7 and to plane 39 at vertex 5. Thus, artist vectors 12 and 13 control a relative orientation of implicit curved surface 40 to the planar surface of primitive 2. For example, a more obtuse angle defined by artist vectors 12 and 13 and the surface of primitive 2, would result in a larger angle of departure of implicit surface 40 from the surface of primitive 2. In one example, implicit surface 40 is implicit in the sense that a point on implicit surface 40 can be determined for a given location on primitive 2 and using that location as input to a procedural definition or a parametric definition of implicit surface 40. In one example, implicit surface 40 is defined using a set of offset coefficients determined from the artist vector for each of the vertices and a polynomial (e.g., cubic) function that blends these offset coefficients using barycentric coordinates for an intersection point, for which an offset is to be determined. Extrapolating from this 2-D example, it would be understood that implicit surface 40 also would be tangent to a plane perpendicular to an artist vector for the third vertex (for a triangle), not depicted in FIG. 3. Also, although implicit surface 40 is shown to intersect each of vertices 5 and 7, there is no requirement that an implicit surface used to implement these disclosures have such a characteristic. For example, implicit surface 40 can still be tangent to planes 38 and 39 at another location, such as a position or offset along vectors 12 and 13.

In FIG. 3, ray 15 is shown hitting primitive 2 at intersection point 20, and that an original occlusion ray 31, which has an origin at intersection point 20, would be cast towards light 26. However, in FIG. 3, instead of casting occlusion ray 31, an offset is determined, and an occlusion ray is cast from an offset origin 42, which is located based on the offset (which in this conceptual depiction, locates the offset origin to a position on implicit surface 40). For example, modified occlusion ray 36 represents a ray cast from offset origin 42, determined by offsetting along per-primitive normal 11 a calculated amount. Alternatively or additionally, a ray can be cast from an origin along a direction of ray 15. In the depiction of FIG. 3, an intersection point between implicit surface 40 and ray 15 can be used to locate offset origin 41 (an origin for modified occlusion ray 35.) By definition, the intersection point between ray 15 and implicit surface 40 is an offset amount along ray 15, calculated according to the definition used for implicit surface 40.

A person of ordinary skill may understand from FIG. 3 that embodiments of the disclosure may have a characteristic that a geometric model may include or be associated with data that is interpretable to control an amount and a distribution of possible offset that for secondary rays to be cast in response to intersections with primitive 2. Additionally, a size of primitive 2 also controls how large the amount of possible offset can be, where a larger primitive may have a larger offset, in general. A direction along which a calculated offset amount can be applied may be along an original incoming ray direction, or along a geometric normal, for example. In still further implementations, origins may be offset in a random or pseudorandom direction from an intersection point.

FIG. 4 depicts another example of how offsets can be determined and may vary with an intersection point on the surface of a primitive. FIG. 4 depicts vertexes 51 and 52, each associated with a respective artist vector 53 and 54, used in defining a primitive 50. Applying the disclosure above concerning construction of implicit surface 40 to the particulars of FIG. 4 results in a surface, that has a cross section like that of implicit surface 55. Implicit surface 55 thus is non-symmetrical, in that artist vectors 53 and 54 also are not symmetrical. Since artist vector 54 produces a less obtuse angle relative to primitive 50 than artist vector 53, implicit surface 55 deviates less from primitive 50 near vertex 52 than near vertex 51. In general, implicit surfaces 40 and 55 can be viewed as a domain of a function over the range of inputs that define a valid intersection point in primitives 2 and 50, respectively. Examples of such mapping for different intersection points is shown in FIG. 4 by points 60, 61 and 62 on primitive 50 that respectively map to points 63, 64 and 65 on implicit surface 55.

FIG. 5 exemplifies a further situation to be accounted for in some implementations. In FIG. 5, a primitive 70 is defined from vertices 71 and 72 (other vertices defining primitive 70 not depicted). Artist vectors 76 and 75 make acute angles with primitive 70, by contrast with both FIG. 3 and FIG. 4, in which artist vectors made obtuse angles with respect to their primitives. As such, if an implicit surface is determined in accordance with the examples above, then such surface would be "under" the surface of primitive 70, as shown by implicit surface 73. Here, "under" is relative to a direction of per-primitive normal 82, which points in a "front facing" direction. Locating an origin for a secondary ray on a side opposite from a direction in which normal 82 was pointing from would result in erroneous behavior, in general. Thus, in such a circumstance, an offset can be clipped so that the origin remains either on a surface of primitive 70, or another defined minimum offset that does not put the origin for a secondary ray on the "back side" of primitive 70.

The depiction of implicit surface 40 is for assisting in conceptualizing an implementation according to the disclosure, but such implementations do not need to have defined such a surface, but rather may implement a mechanism to provide an initial measure of potential offset, which relates to characteristics of the geometric model of which the primitive is a part. This initial measure of potential offset can be modified based on a specific intersection point on the primitive to arrive at a final offset value, or a final position for an origin of a secondary ray.

A more specific example implementation of the disclosures in FIGS. 1-5 is disclosed with respect to FIGS. 6-10 and in the appendix attached hereto, which includes an example set of machine executable instructions for configuring a machine to perform an implementation of the disclosure.

Figures 6, 7:
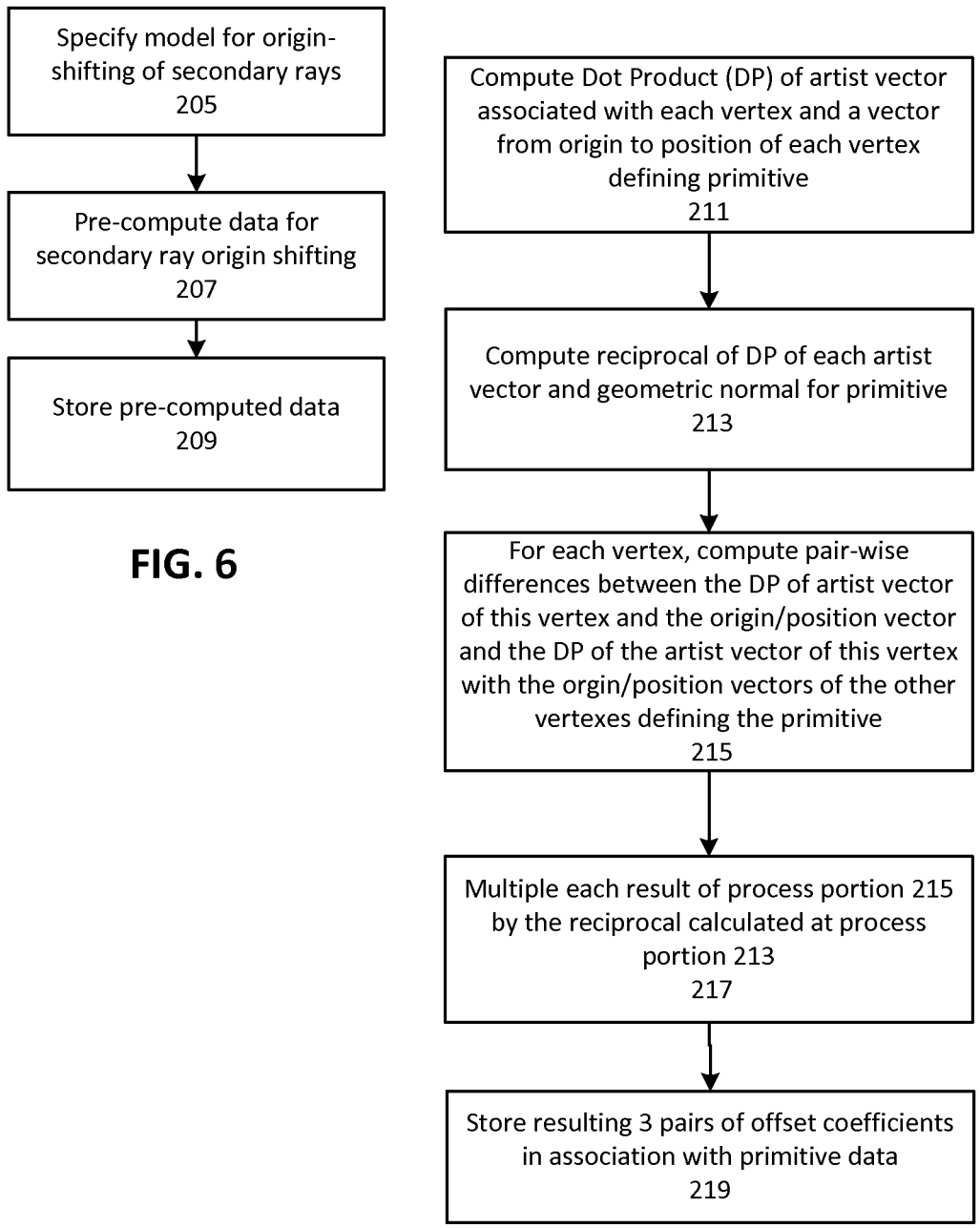
FIG. 6 depicts an example process of pre-processing data to be used in implementing embodiments of the disclosure.
FIG. 7 depicts an example approach to generating data that can be used to implement an example according to the disclosure.

FIG. 6 depicts an example process that can be performed in an implementation according to the disclosure. FIG. 6 depicts that such a process may comprise, at 205, specifying a model for origin shifting of secondary rays (e.g., occlusion rays). Specifying a model may include determining a convention for defining a function that maps intersection points on a surface of a primitive to respective points offset from the surface of the primitive. In some implementations, a portion of the calculations to be performed in determining such intersection-specific offsets can be invariant to the intersection point, and can be performed in advance. At 207, such calculations are performed and at 209, data resulting from these calculations is stored in association with the primitive. Here, being stored in association provides that such data can be retrieved when needed to determine an offset for a particular intersection point, or for other purposes, but does not require any particular organization or relative arrangement of data defining the primitive and the pre-computed data. An example of computation that may be performed pursuant to 207 is depicted in FIG. 7.

In FIG. 7, at 211, Dot Products (DPs) between an artist vector associated with each vertex and a vector determined from an origin of a 3-D scene to the location of each vertex defining the primitive is taken. For example, considering vertex 5 of primitive 2, dot products between artist vector 12, and each of the three vectors from a scene origin (in which primitive 2 is located) to vertexes 5, 6 and 7 are calculated. This set of dot products is calculated for each of the vertexes, so that nine dot products would be calculated for primitive 2 at process portion 211 of FIG. 7.

At 213, a reciprocal of a dot product between each artist vector and the geometric normal for the primitive is taken. For primitive 2, this would involve performing three dot product operations and then taking a reciprocal for each.

At 215, for each vertex, differences between the DP of the artist vector for this vertex and the origin/position vector for this vertex (calculated at 211) and each DP between the artist vector for this vertex and the origin/position vectors for the other vertexes are taken. For example, considering vertex 5 of primitive 2 in FIG. 1, a DP ("first DP") was taken between artist vector 12 and a vector defined between the origin of the 3-D scene and the position of vertex 5. Also, a respective DP was taken between artist vector 12 and vectors between the 3-D scene origin and the positions for each of vertexes 6 and 7 ("second DP" and "third DP", respectively). At 215, the first DP is differenced with respect to each of the second DP and the third DP. Each of vertexes 6 and 7 are treated similarly. This gives a set of two offset coefficients for each vertex, in the direction of each of the other two vertices of primitive 2. The calculations described here are an implementation to produce offset coefficients having a magnitude related to the size of primitive 2; as such, this example can be adapted or used to inform those of ordinary skill to implement other approaches to produce pre-computed data having this characteristic. At 217, the offset coefficients are multiplied by the respective reciprocal calculated at 213 (e.g., the pair of coefficients for vertex 5 are multiplied by the reciprocal involving artist vector 12). The resulting 3 pairs of coefficients can then be stored in association or for later use in determining offsets for specific intersection points on primitive 2.

Figure 8:
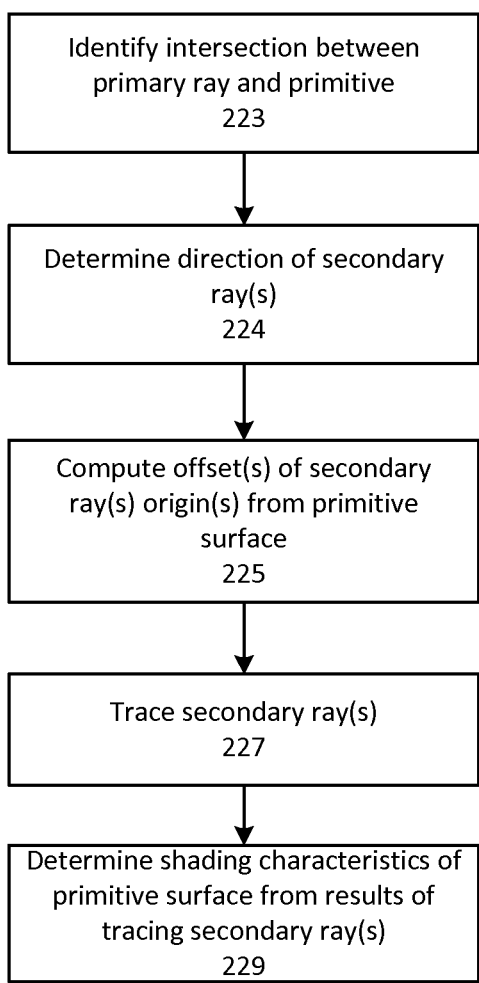
FIG. 8 depicts an example process of ray tracing.

FIG. 8 depicts an example process of ray tracing, in which can be incorporated the origin offsetting disclosures found herein. At 223, an intersection between a primary ray and a primitive is identified. At 224, a respective direction for each secondary ray is determined and at 225, secondary ray(s) are defined to have origins that are offset from an intersection point of the primary ray and the primitive by an offset amount, determined by applying an offset determination procedure (an example of which is disclosed in more detail in FIG. 9). At 227, the secondary ray(s) are traced. At 229, shading characteristics for the primitive surface are determined using results of tracing the secondary ray(s) (as would be understood, such process can be iterative and repetitive, such that this example does not imply that shading results are computed directly from any specific secondary ray, but that these traced secondary rays may contribute in some way to a shading characteristic of the primitive surface).

Figure 9:
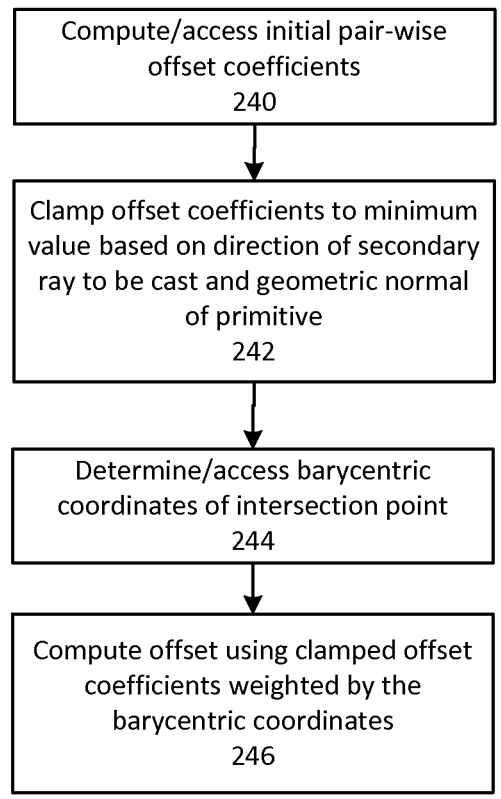
FIG. 9 depicts an example process that can be used in the process depicted in FIG. 8, to implement origin offsets according to the disclosure.

FIG. 9 depicts a more specific example of how an offset for a particular intersection point can be determined, relying on the previous disclosures herein. At 240, offset coefficients for each vertex are computed or accessed. These offset coefficients can be computed by an implementation according to the example of FIG. 7, or accessed, if these coefficients were generated in advance. At 242, the offset coefficients may be clamped to a minimum value, in dependence on a direction of the secondary ray and the per-primitive normal. Such clamping, if applied, is to avoid a situation where an offset would otherwise put the origin on an "inside" of the primitive (i.e., opposite to a direction of the per-primitive normal). At 244, barycentric coordinates of a particular intersection point are accessed, if produced as a byproduct of intersection testing, or calculated. At 246, the barycentric coordinates are used in a weighted blending of the offset coefficients to produce an offset value to be applied to one or more secondary rays to be cast for that intersection. See the Appendix for a more specific example of machine usable code that can be used to implement aspects of the disclosure.

The above exemplary processes and portions thereof showed one way to implement an example approach to offsetting origins of secondary rays, where an amount of offset can be modulated by an intersection point, and also is influenced by offset coefficient data derivable from information associated with source geometry. These examples do not imply that implementations of these examples follow the same or similar process flow. For example, unless one computation requires an input from another computation, computations can be selectively ordered. Also, implementations may be able to process or product certain information by concurrent processing. As such, the linearized process flow shown in the examples is for the sake of description and does not imply that an implementing algorithm would have to produce the values described in such fashion. These examples show that one effect achieved in some implementations is that secondary rays are traced from an origin that is offset by an amount dependent on an intersection location on the primitive; for example, where different primary rays intersect the same primitive at different locations and emit secondary rays, these secondary rays will have origins at different locations.

Further disclosure concerning example apparatus or components thereof which may implement the disclosed processes or portions thereof is found with respect to FIG. 10 and FIG. 11 below.

Figure 10:
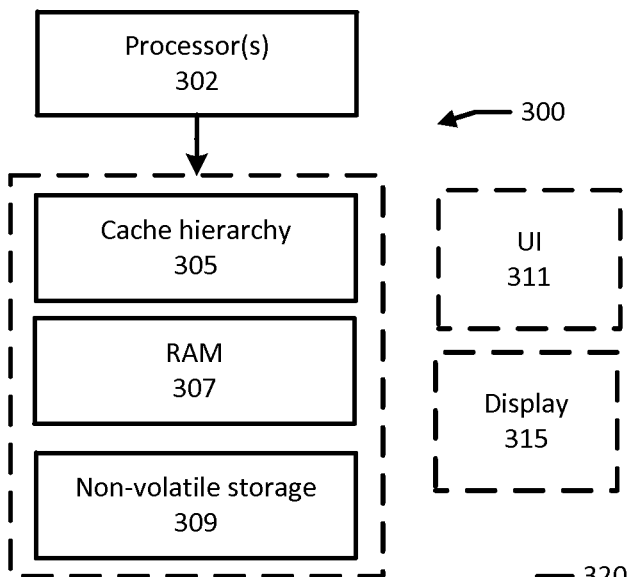
FIG. 10 depicts an example apparatus in which disclosed aspects of secondary ray origin offsetting can be practiced.

FIG. 10 depicts an example apparatus 300 in which aspects of the disclosure can be practiced. Apparatus 300 comprises processor(s) 302 that communicate with non-transitory memories, such as a cache hierarchy 305, which can store a subset of data located in Random Access Memory (307). Non-volatile storage 309 may store data that is loaded into RAM 307, including instructions for configuring processor(s) 302 to perform processes implementing aspects of the disclosure. A User Interface (UI) 311 may be provided to accept input from a user, although a UI is not necessary in embodiments according to FIG. 10. A display 315 also may be provided to display outputs of processing according to the disclosure. Outputs also may be stored in any one or more of the memories 305, 307 and 309. Apparatus 300 may implement an intersection testing process, which performs by identifying a closest intersection of a ray having a specified origin and direction with primitives defining objects located in a 3-D scene. This intersection testing function can be implemented by a process that accepts a definition for the ray and traverses the ray through a scene acceleration structure comprising elements that bound subsets of the primitives, and ultimately tests the defined ray for intersection any primitives not excluded from a potential intersection by the traversal through the acceleration structure. A closest intersection identified, if any, can be used as an intersection point according to the disclosure.

The definition of the secondary ray can be performed by a portion of machine executable code (e.g., a module of shader code) that is selected in response to identifying an intersection between a primary ray and a primitive. Ray tracing of a particular image can begin by emitting a set of primary rays that are traced from particular pixels of the 2-D image. Processes or portions thereof depicted in FIGS. 6-9 can be implemented by modules of shader code executing on processor(s) 302. An Application Programming Interface (API) can be used to provide a description of a 3-D scene that is to be used in a ray tracing operation. The API can be implemented by modules of machine executable code executing on processor(s) 302. The API can perform implementations of the processes depicted in FIGS. 6-7, in order to pre-compute offset coefficients. The API can determine an organization of data describing the 3-D scene, and the pre-computed data, for use during ray tracing.

Figure 11:
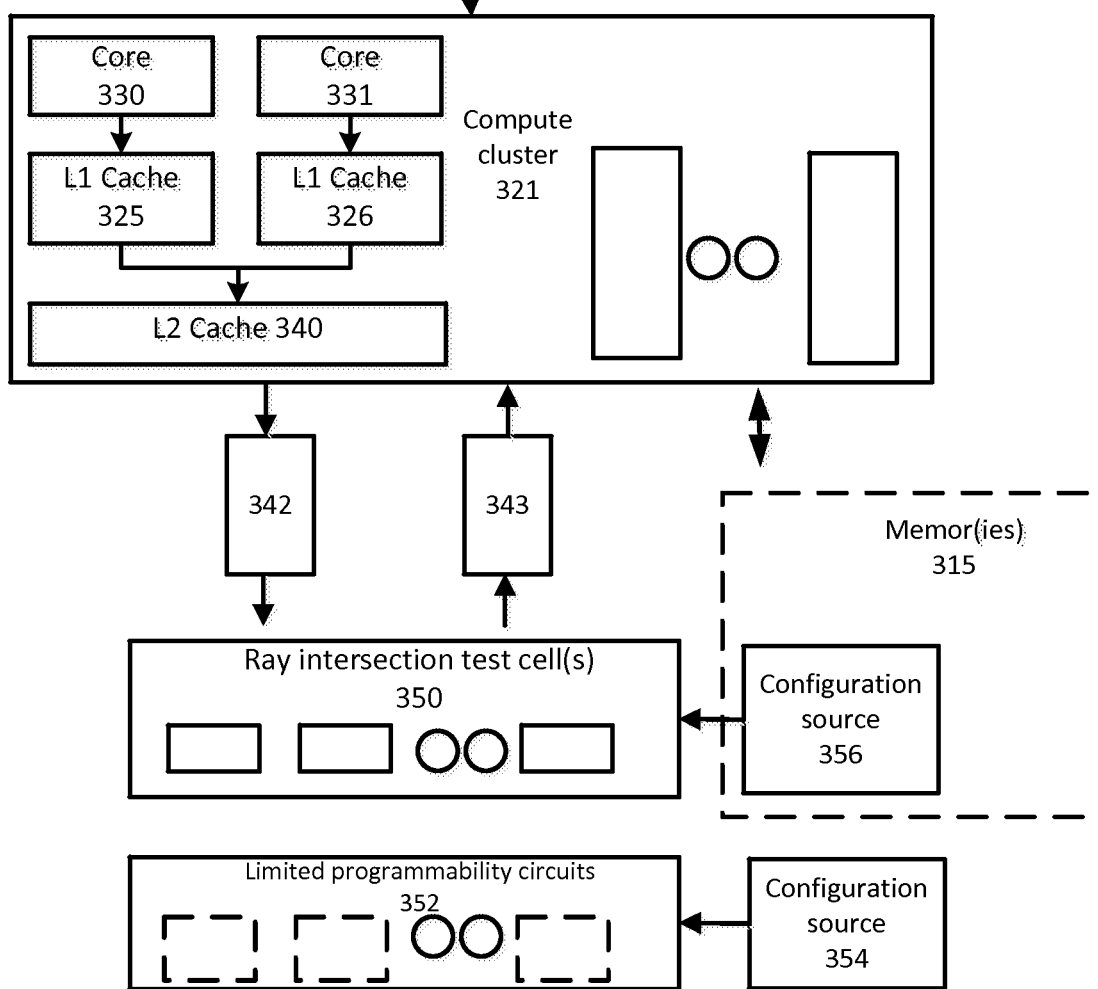
FIG. 11 depicts another example apparatus in which disclosed aspects of secondary ray origin offsetting can be practiced.

FIG. 11 depicts another example apparatus 320 that can be used to implement a ray tracing according to the disclosure. Apparatus 320 comprises a computation cluster 321 that has a plurality of computation cores, such as computation cores 330 and 331, each of which has a private L1 cache 325 and 326, and uses a shared L2 cache 340. Compute cluster 321 sends data to a set of ray intersection test cells 350 through a queue 342, and receives data from ray intersection test cells 350 from queue 343. Ray intersection test cells 350 comprise computation that is configured to execute one or more intersection testing algorithms. For example, ray intersection test cells 350 may each comprise hardware logic that can be configured to perform an intersection test between a ray and an acceleration structure element or between a ray and a primitive. Separate dedicated fixed-function hardware units can be provided for testing primitives or acceleration structure elements for intersection. Ray intersection test cells 350 also can be implemented as threads of computation executing on compute cluster 321, or as a combination of threads of computation and separate hardware logic, fixed or configurable. Where ray intersection test cells 350 are at least partially configurable, they can be configured from configurable source 356. In one implementation, such configuration source can be within a memory shared with compute cluster 321, or can be a dedicated configuration memory, such as a microcode or embedded non-volatile storage co-located with the ray intersection test cells.

In an example, ray intersection test cells 350 may interface with a set of limited programmability circuits 352 that are configurable using configuration information accessed from a configuration source 354. These limited programmability circuits 352 can be used for example, to calculate dot products used in determining the offset coefficients or other related calculations. For example, these circuits can have an input that accepts two vectors and performs a selected operation from a pre-configured set of operations. In such an example, these coefficients may be returned with an intersection testing result, analogous to returning barycentric coordinates for an intersection point. Ray intersection test cells 350 include one or more test cells.

The Appendix depicts a listing of machine readable instructions that can be used to produce an implementation of the disclosure for applying the disclosure to defining occlusion rays directed towards light sources. The instructions show an determining a measure of a size of a primitive by determining difference of the form (an_dot_pos−(dot (artist_normal, p1))), where an_dot_pos is value of a DP between an artist vector ("artist normal") for a specific vertex (e.g., p0), and dot(artist_normal, p1) represents a DP between that same artist normal and a vector directed from the scene origin to vertex p1. The depicted code is for a triangular vertex and includes such calculation also for vertex p2. These calculations thus produce a value correlated to a relative size of the primitive. A reciprocal between the artist vector for a given vertex (e.g., p0) and the geometric normal for the primitive will be a larger value when the artist vector is more divergent from the geometric normal. Thus, this calculation makes larger offset coefficients for a particular vertex (e.g., p1off0, which is the offset coefficient for p1 in the direction to p0) when its artist vector diverges more from the geometric normal for the primitive. The examples related primarily to triangular primitives (whether individually specified or specified as meshes or other kind of grouping). However, applications of the disclosure are not limited to triangles. Another example of a primitive is a quadrilateral patch. Other primitives can be specified with higher order functions, such as a spline functions. If using non-triangular primitives, then an appropriate way to express a hit point on such primitive(s) can be provided. Thus, another embodiment within the disclosure is that data for a 3-D object includes data that is encoded as per-vertex directional information, which can be normalized. Multiple of such per-vertex directional information, from different vertexes defining an intersected surface, is blended according to relative positions of those vertices with an intersection point on the surface to produce an offset value. An example way in which this blending can occur was provided above, along with an example of how certain information used could be pre-calculated.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of each of the processes described herein includes machine executable code used to configure a machine to perform such process implementation. Other means for realizing implementations of the disclosed processes includes using special purpose or limited-programmability hardware to realize portions of the processes, while allocating overall control and management and a decision when to invoke such hardware to software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A computer-implemented method of rendering an image of a 3-D scene using a ray tracing system, the method comprising:
   subsequent to an identification of an intersection between a first ray and a primitive located in the 3-D scene, emitting a secondary ray having an origin which lies on an implicit curved surface associated with the primitive, wherein said intersection between the first ray and the primitive is at an intersection point, and wherein the origin of the secondary ray is offset from the intersection point; and
   processing the secondary ray for use in rendering the image of the 3-D scene.

2. The method of claim 1, wherein the secondary ray is emitted in response to the identification of the intersection between the first ray and the primitive.

3. The method of claim 1, wherein the origin of the secondary ray does not lie on the primitive.

4. The method of claim 1, wherein the first ray is a primary ray, and wherein the primitive is a planar primitive.

5. The method of claim 1, wherein the origin of the secondary ray is offset from the intersection point by an offset amount which varies in dependence upon the position of the intersection point.

6. The method of claim 1, wherein the origin of the secondary ray is offset from the intersection point by an offset amount which is dependent on a relative position of the intersection point to vertices defining the primitive in the 3-D scene.

7. The method of claim 1, wherein the origin of the secondary ray is offset from the intersection point by an offset amount which is dependent on indicia of curvature calculated for the primitive.

8. The method of claim 7, wherein the indicia of curvature comprise coefficients associated with respective vertices of the primitive and the offset is determined based at least in part on using the coefficients in a polynomial that weights the coefficients using barycentric coordinates of the intersection point.

9. The method of claim 1, wherein offset coefficients are calculated for each vertex defining the primitive, a value for each offset coefficient being calculated based on defining a respective perpendicular to a vector associated with each of the vertices defining the primitive, and wherein the method further comprises mapping the intersection point to a point on the implicit curved surface required to be tangent to each of the perpendiculars at the respective vertices.

10. The method of claim 1, wherein the primitive is a triangle and a respective pair of coefficients are calculated for each of three vertices defining the triangle, wherein the coefficients of a pair define an initial offset for the respective vertex towards each of the other two vertices defining the triangle, and wherein these coefficients are modulated to produce a final value for the origin offset, using barycentric coordinates of the intersection point.

11. The method of claim 1, wherein the planar primitive is a triangle and the origin offset is determined using barycentric coordinates for the intersection point to determine a blending among offset coefficients associated with the vertices of the triangle, wherein each of the offset coefficients is determined based on a dot product of a vector associated with one of the vertices and a geometric normal associated with the primitive, weighted by a measure of a size of the primitive.

12. The method of claim 1, wherein the offset of the origin from the intersection point is in a direction along a geometric normal of the primitive at the intersection point.

13. The method of claim 1, wherein the offset of the origin from the intersection point is along the incoming direction of the first ray.

14. The method of claim 1, wherein said processing the secondary ray for use in rendering the image of the 3-D scene comprises:
tracing the secondary ray through the scene to identify an intersection involving the secondary ray; and
using the results of the tracing of the secondary ray in rendering the image of the 3-D scene.

15. The method of claim 14, wherein the secondary ray is an occlusion ray, and the tracing determines whether a source of light in the direction of that occlusion ray, if any, is prevented from reaching the surface of the primitive.

16. A ray tracing system for rendering an image of a 3-D scene, the ray tracing system comprising:
a ray definition module configured to, based on an identified intersection between a first ray and a primitive located in the 3-D scene, define a secondary ray to be emitted, the secondary ray having an origin which lies on an implicit curved surface associated with the primitive, wherein said intersection between the first ray and the primitive is at an intersection point, and wherein the origin of the secondary ray is offset from the intersection point; and
at least one processing unit configured to process the secondary ray for use in rendering the image of the 3-D scene.

17. The ray tracing system of claim 16, wherein the origin of the secondary ray is offset from the intersection point by an offset amount which varies in dependence upon the position of the intersection point.

18. The ray tracing system of claim 16, wherein the offset of the origin of the secondary ray is along one of the incoming direction of the first ray and a geometric normal for the primitive at the intersection point.

19. A non-transitory computer readable medium having stored thereon computer executable instructions, which when executed cause at least one processor to render an image of a 3-D scene by:
in response to an identification of an intersection between a first ray and a primitive located in the 3-D scene, emitting a secondary ray having an origin which lies on an implicit curved surface associated with the primitive, wherein said intersection between the first ray and the primitive is at an intersection point, and wherein the origin of the secondary ray is offset from the intersection point; and
processing the secondary ray for use in rendering the image of the 3-D scene.

* * * * *